(12) United States Patent
Lo et al.

(10) Patent No.: US 12,313,786 B2
(45) Date of Patent: May 27, 2025

(54) LIGHT DETECTING AND RANGING (LiDAR) DEVICES AND THE LIKE

(71) Applicant: ADVANCED MICRO FOUNDRY PTE. LTD., Singapore (SG)

(72) Inventors: Guo Qiang Patrick Lo, Singapore (SG); Bo Li, Singapore (SG); Lian Xi Larry Lia, Singapore (SG)

(73) Assignee: ADVANCED MICRO FOUNDRY PTE. LTD., Singapore (SG)

( * ) Notice: Subject to any disclaimer, the term of this patent is extended or adjusted under 35 U.S.C. 154(b) by 978 days.

(21) Appl. No.: 17/414,999

(22) PCT Filed: Dec. 26, 2019

(86) PCT No.: PCT/SG2019/050639
§ 371 (c)(1),
(2) Date: Jun. 17, 2021

(87) PCT Pub. No.: WO2020/139196
PCT Pub. Date: Jul. 2, 2020

(65) Prior Publication Data
US 2022/0065997 A1 Mar. 3, 2022

(30) Foreign Application Priority Data
Dec. 28, 2018 (SG) .......................... 10201811769X

(51) Int. Cl.
*G01S 7/481* (2006.01)
*G02F 1/025* (2006.01)

(52) U.S. Cl.
CPC ............ *G01S 7/4817* (2013.01); *G02F 1/025* (2013.01)

(58) Field of Classification Search
CPC .......... G02F 1/025; G02F 1/035; G02F 1/225; G02F 1/292; G02F 1/2955; G01S 7/4817; G01S 17/89
See application file for complete search history.

(56) References Cited

U.S. PATENT DOCUMENTS

| | | |
|---|---|---|
| 10,074,901 B2 | 9/2018 | Byun |
| 2002/0080065 A1 | 6/2002 | Fujii |

(Continued)

OTHER PUBLICATIONS

International Preliminary Report on Patentability for corresponding application PCT/SG2019/050639 filed Dec. 26, 2019; Mail date Jul. 30, 2020.

(Continued)

*Primary Examiner* — Isam A Alsomiri
*Assistant Examiner* — Joseph C Fritchman
(74) *Attorney, Agent, or Firm* — Bookoff McAndrews, PLLC

(57) ABSTRACT

An antenna or antenna array for a steerable light beam, the antenna array comprising a plurality of linear antenna arrays (100), each linear antenna array comprising: a plurality of antenna elements (104); a waveguide (102) supporting the antenna elements having a length and a thickness; and a control element (400, 402, 404), adjacent to the waveguide, arranged to induce a change in refractive index along at least a part of the length of the waveguide and in at least a part of the thickness of the waveguide, wherein the change in refractive index in the waveguide causes a phase shift in light emitted via each of the plurality of antenna elements.

15 Claims, 6 Drawing Sheets

(56) References Cited

U.S. PATENT DOCUMENTS

2006/0091305 A1\* 5/2006 Grunnet-Jepsen .......................... G01D 5/35316
  250/363.06
2012/0087613 A1\* 4/2012 Rasras .................. G02F 1/2257
  257/E31.124
2017/0131615 A1 5/2017 Park
2020/0408884 A1\* 12/2020 Nakamura ............... G02B 5/04

OTHER PUBLICATIONS

International Search Report for corresponding application PCT/SG2019/050639 filed Dec. 26, 2019; Mail date Feb. 4, 2020.
Written Opinion for corresponding application PCT/SG2019/050639 filed Dec. 26, 2019; Mail date Feb. 4, 2020.

\* cited by examiner

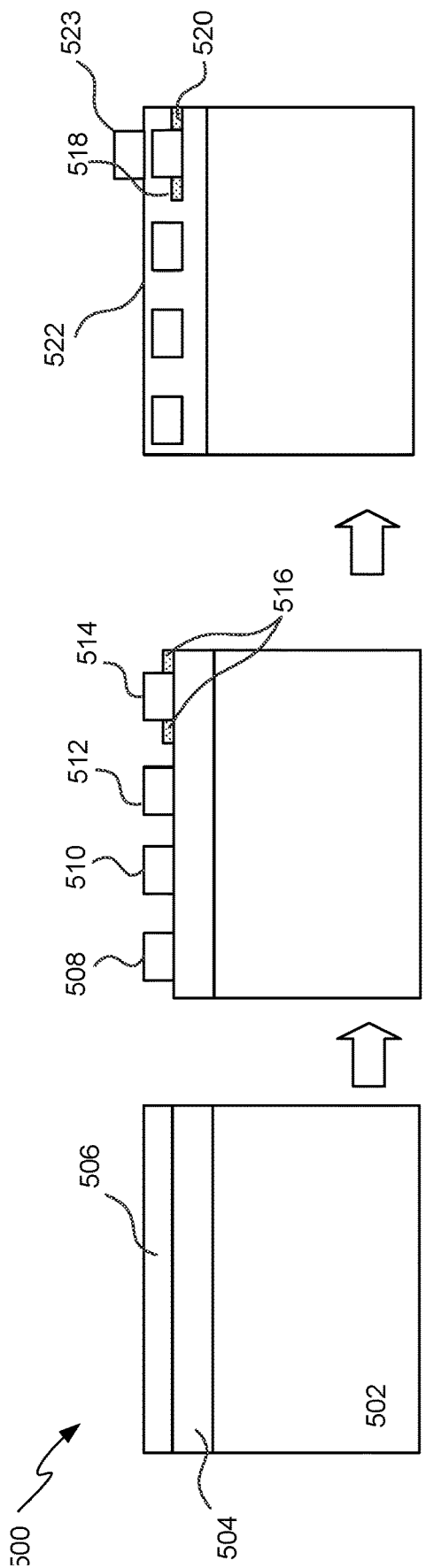
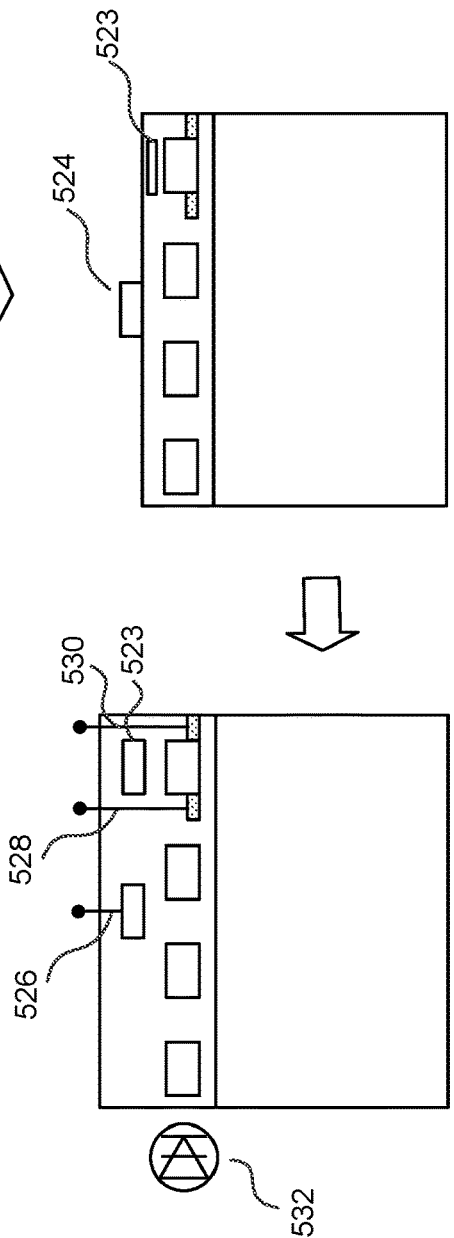

LIGHT DETECTING AND RANGING (LiDAR) DEVICES AND THE LIKE

FIELD OF THE INVENTION

The present invention relates to improvements in or relating to light detecting and ranging devices (LiDAR) and methods of making the same, particularly, but not exclusively to two dimensional (2D) steering.

BACKGROUND

LiDAR technology uses light sensors to measure a distance between a sensor and an object. LiDAR devices are typically used in both moving and still scenarios. Important mobile applications exist in automotive applications. The resultant image is extremely detailed.

The data captured by a LiDAR is very accurate, high resolution 3D data and results in a set of points suspended in a 3D space. These points can be displayed or converted into a 3D mesh.

LiDAR relate to a very useful, high accuracy measurement technique and are cost effective to manufacture. The basic principle behind LiDAR is to measure time of flight (TOF) and convert this into distance.

Distance=(Speed of Light×Time of Flight)/2

A LiDAR can take many different forms, such as arrays having moving parts and more recently solid state arrangements. In addition, there have been developments in steering the light from an emitter towards a 3D space to generate an array based image having the above mentioned points in a 3D output. Different types of LiDAR are made in different ways and some are more appropriate for steering adaptation than others. The LiDAR solutions that involve mechanical moving parts tend to reduce the scanning speed and lifetime of the device. Solid state LiDAR removes the moving part but requires a reliable 2D steering solid state optical phase array (OPA).

A number of proposals exist in which the phase change of each individual antenna in an antenna array has 1D beam steering. For the second dimension, wavelength tuning is the most common way to realize the steering. However, wavelength tuning is generally achievable in a laboratory environment but is not easily implemented in a real commercialized product or in a cost effective manner.

A solution provided by many is to control the phase of each individual element by controlling the phase of each antenna in two directions. This typically requires the use of an expensive tunable laser source (TLS) and complex processing and control circuitry. The TLS is used to sweep the output wavelength so it will be used for the wavelength scanning method mentioned above. This requires many antennas to form a 2D array and achieve the necessary scanning. This is costly and extremely complex and thus is not suitable for many of the economic LiDAR products currently being considered.

The embodiments described below are not limited to implementations which solve any or all of the disadvantages of the prior art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an embodiment there is provided an antenna or antenna array for a steerable light beam, the antenna array comprising a plurality of linear antenna arrays (100), each linear antenna array comprising: a plurality of antenna elements (104); a waveguide (102) supporting the antenna elements having a length and a thickness; and a control element (400, 402, 404), adjacent to the waveguide, arranged to induce a change in refractive index along at least a part of the length of the waveguide and in at least a part of the thickness of the waveguide, wherein the change in refractive index in the waveguide causes a phase shift in light emitted via each of the plurality of antenna elements.

Preferably, the change in refractive index is induced in a linear region (108) of the waveguide.

Preferably, the linear region is located along the length of the waveguide.

Preferably, the defined linear region is in a lower portion of the waveguide.

Preferably, the change in refractive index is caused by application of a voltage or heat to the portion of the waveguide from the control element.

Preferably, heat is applied by a heater element located juxtaposed to the portion of the waveguide.

Preferably, there are two heating elements (404), one on either side of the portion of the waveguide.

Preferably, a voltage is applied via a pair of doped regions (400, 402) located on either side of the portion of the waveguide.

Preferably, the control elements define a first longitudinal phase shifter (110) in the waveguide.

Preferably, a transverse phase shifter (200) is located at an end of the waveguide.

Preferably, light emitted by the antenna array is steerable by at least one of the first and second phase shifts in one or more directions.

Preferably, light emitted by the antenna array is steerable by tuning the phase shift between adjacent antenna elements in the array.

Preferably, a single control signal is applied in respective orthogonal directions by inducing the change in the refractive index in corresponding respective orthogonal directions.

Preferably, the waveguide is made from a low loss material such as for example Silicon (Si) or Silicon Nitride (SiN).

Preferably, the antenna elements are made from one of Silicon Nitride (SiN), Silicon Dioxide (SiO2), and Aluminum Nitride (AlN).

Preferably, there is a combination with an optical power splitter to allow entry of light to the array.

According to a further embodiment there is provided a method of fabricating an antenna or antenna array, the method comprising: forming a first waveguide from a first material (512); forming a plurality of antenna elements (512) from a second material; forming at least one or more additional elements (516; 518, 520) in the vicinity of a portion of the waveguide arranged to induce a change in refractive index along at least a part of the length of the waveguide and in at least a part of the thickness of the waveguide, forming at least one layer of dielectric material (504).

Preferably, forming the additional elements as one of a heating element and a voltage generating element can cause a change in the refractive index of the defined portion of the waveguide.

Preferably, further comprising forming at least one of a beam coupler, a beam splitter, and a transverse phase shifter.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIGS. 5A to AE show the manufacturing steps for making the LiDAR antenna array.

Figure 1:
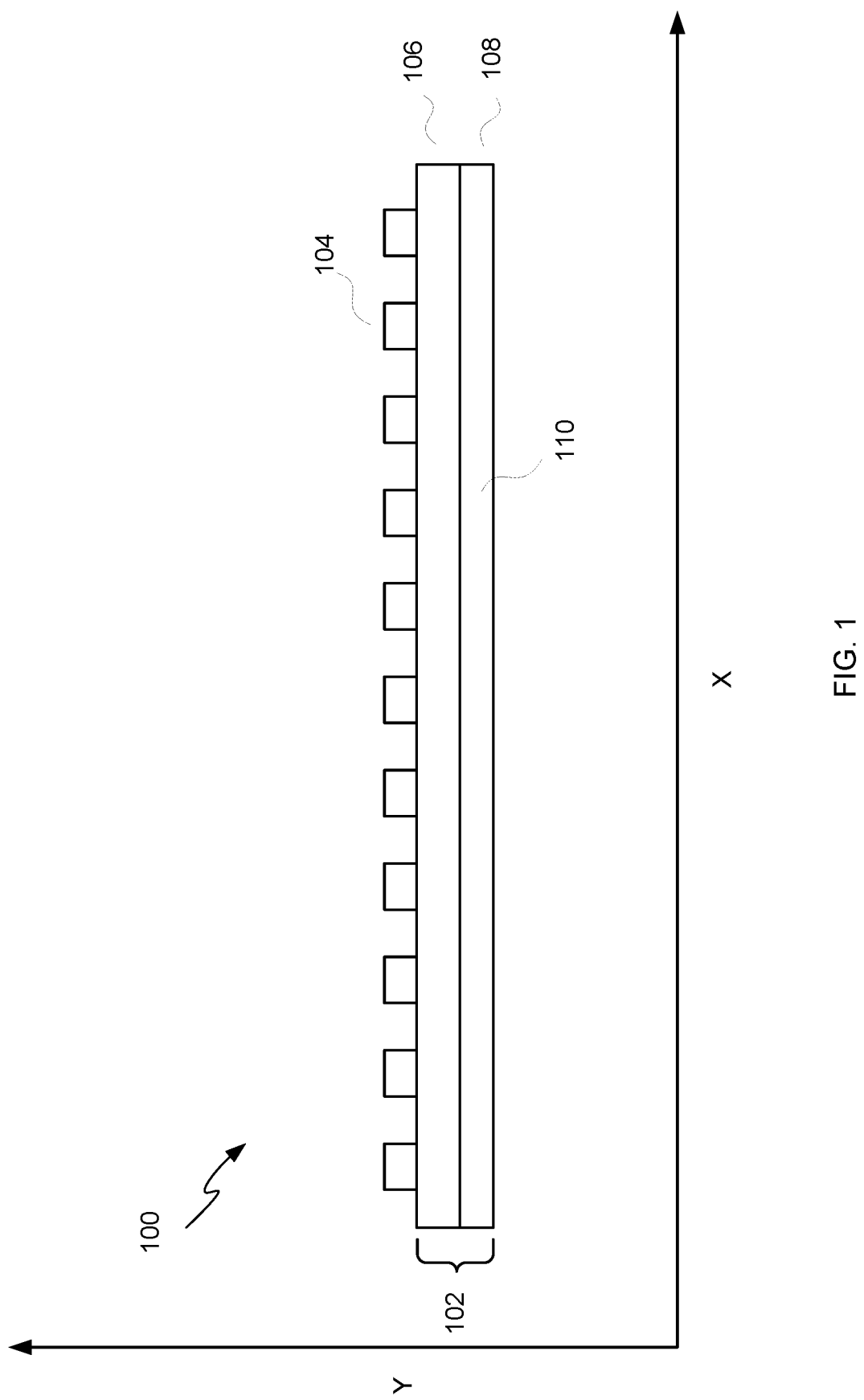
FIG. 1 shows a schematic diagram of a linear antenna array forming part of a LiDAR antenna array as shown in FIG. 2.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present invention relates to a solid state LiDAR antenna array which can achieve 2-D beam steering using a single wavelength incident light source. In addition, a schematic diagram shows the manufacturing steps required to manufacture such a LiDAR antenna array.

A LiDAR system generally comprises four main components: a laser; a scanner and associated optics for emitting a beam; a photodetector and receiving device; and navigation and positioning systems. A LiDAR can be used in many imaging applications including, but not limited to automobiles, robotics, drones and the like. The type of laser and detection devices will depend on the particular use of the LiDAR. A LiDAR has a high rate pulsed laser source which can generate pulses up to about 150,000 pulses per second. A sensor determines the amount of time it takes for each pulse to travel to the object and back. By repeating the transmission and sensing in quick succession an image of an object can be built up.

The scanners and associated optics can be based on a variety of scanning methods for different purposes such as azimuth and elevation, dual oscillating plane mirrors, dual axis scanner and polygonal mirrors etc.

When a LiDAR sensor is mobile such as on a satellite, airplane or other moving object, it is necessary to determine the precise position and the orientation of the sensor to ensure that the data can be accurately processed. Global Positioning Systems provide accurate geographical information regarding the position of the sensor and an Inertia Measurement Unit (IMU) records the precise orientation of the sensor at that location.

A solid state LiDAR as described herein, may include an array of antenna elements which can illuminate in any direction by controlling the timing (phase) of each antenna to steer a cohesive signal in a specific direction for example towards the object.

FIG. 1 shows an individual linear antenna array 100 for a light emitter. The light emitter is for use in a LiDAR or similar device. The linear antenna array includes a waveguide shown generally at 102 and a plurality of antenna elements 104. Each antenna element is positioned over the waveguide and may be in contact therewith or spaced apart therefrom by a thin layer of dielectric material (not shown). Examples of materials include SiO2, Al2O3, or could be chose by antenna functions or by process requirement. The number of antenna elements along the length of the linear antenna is chosen to meet the requirements for the overall size of the final array, but any number may be used. The more antenna elements used, the smaller the final spot size in the image, which means the better the resolution. The maximum number of antennas will be determined by the actual device size as well as the tolerance of any fabrication errors.

The waveguide 102 is made from a low loss waveguide material such as for example Silicon (Si); Silicon Nitride (SiN) Silicon oxynitride (SiON), ALN, Amorphous silicon (a-Si) or polycrystalline Silicon (Poly-Si). The waveguide is used to guide light from one end of the waveguide to the other along its length from left to right. The plurality of antenna elements is located in a layer above the waveguide. Each antenna may be made from for example SiN, Silicon Dioxide ($SiO_2$), Aluminum Nitride (AlN). In general, any material with different refractive index compared to cladding material of the waveguide can be used as antenna. The materials listed are not limiting and any materials can be used as long as they are appropriate for the fabrication technique and provide the functionality described herein. It should be noted some materials have a lower coefficient, such as AlN has lower thermo-optical coefficient and hence some phase shifting method may have lower efficiency. The phase shifting method will change according to the materials used. The antennae may be uniformly placed along the length of the waveguide with a regular spacing between respective antennae or may be spaced with variable separations.

In use, light enters the linear array at one end and travels along the waveguide propagation direction, exiting the array via each of the antenna elements. The light emitted via each of the antenna elements interferes and this interference results in a particular far field pattern for the emitted light. The light may enter the linear array via, for example, a laser diode or other coherent light source. As the light passes through the waveguide the intensity varies along the propagation direction such that different antennae elements are illuminated by different intensities of light. In addition, the antenna element size can also be designed to emit the same power along the waveguide propagation direction as the income light intensity is dropping.

The waveguide 102 comprises two regions—a first region 106 and a second region 108. In the described example the second layer is the lower region of the two. The second region 108 defines a longitudinal phase shifter by application of for example, a voltage or heat as will be described in greater detail below. The longitudinal phase shifter is a uniform phase shifter on the lower region of the waveguide that provides a linear phase shift along the waveguide propagation direction. By virtue of the heat or voltage a constant phase shift ΔΦ for each adjacent antenna pixel is generated due to changes in the refractive index (RI). This phase shift that is introduced for light emitted by adjacent antenna elements changes the way that the emitted light interferes and hence changes the far field pattern of the emitted light. The phase shifter extends along the length of the waveguide and all the way to the end of antenna waveguide. The fact that the phase shifter extends along the length of the waveguide enhances the available phase shift amount and hence the overall steering angle.

In the example shown, the longitudinal phase shifter is part of the waveguide (and the first and second regions 106, 108 may be formed in a single stage from the same material) and the longitudinal phase shifter is defined by application of heat or voltage to a part of the waveguide (i.e. to the second region 108). In some examples the longitudinal phase shifter may be a separate layer, apart from or underneath the waveguide. The heat or voltage applied to the second region 108 may be replaced with another type of device or technique for causing either the change in RI or to otherwise provide a linear phase shift along the waveguide propagation direction.

Light leaves the linear array via the respective antenna elements and is directed towards an object before being reflected back and directed to an appropriate sensor not described in detail in this application. The overall output beam is made up of a combination of the light exiting from each antenna element and is steered longitudinally via the longitudinal phase shifter 110 (i.e. as a consequence of the interference of the light emitted via each of the antenna elements). The output light in a far field spot is steered in an angle along the longitude direction by changing the phase difference between adjacent antenna pixels. Use of the beam forming principle can assist in the steering process.

Figure 2:
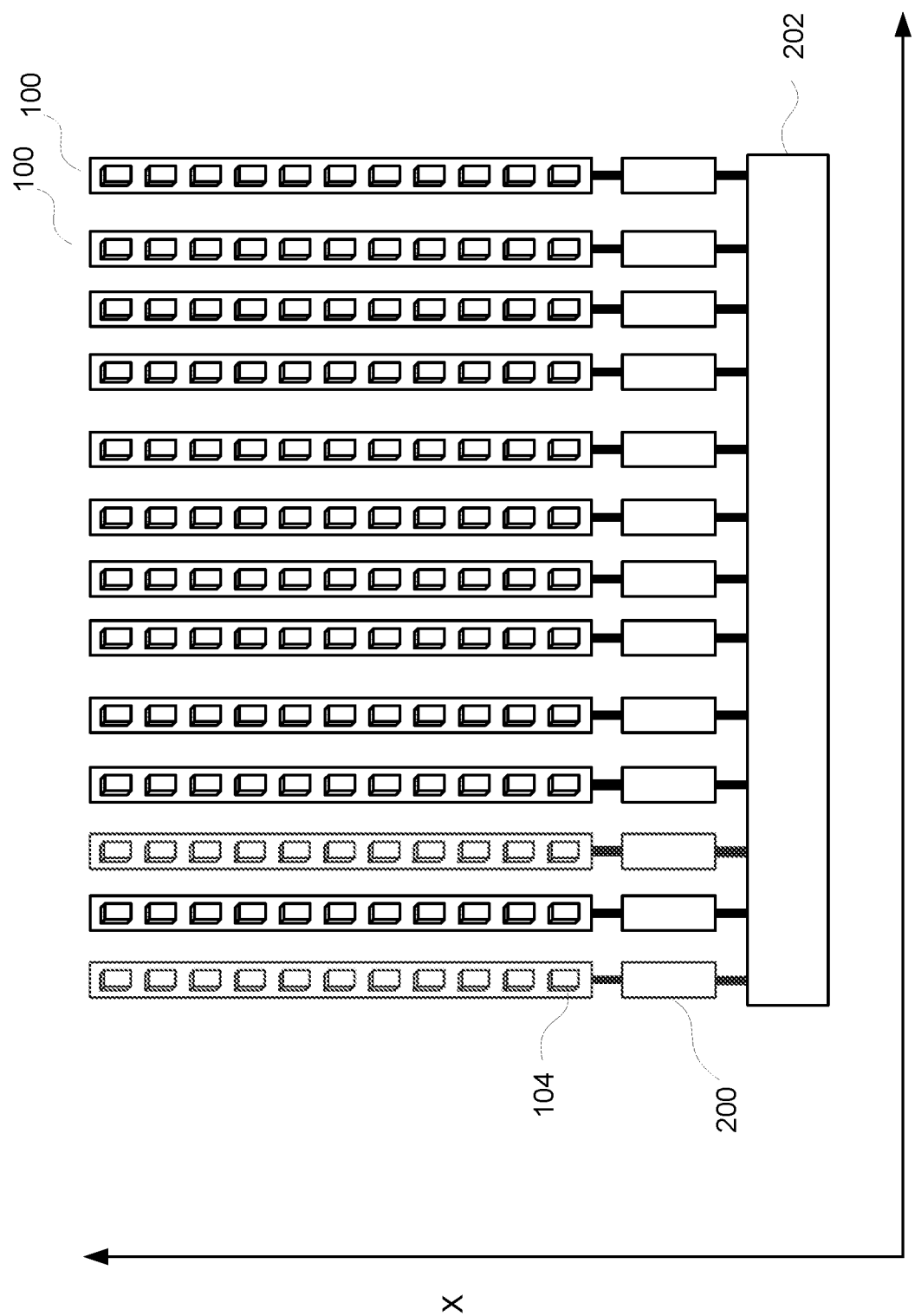
FIG. 2 shows a schematic diagram of a LiDAR antenna array according to an embodiment of the present invention.

Referring now to FIG. 2, a plurality of linear arrays 100 may be combined together to form a LiDAR antenna array having X antennae 104 along the length of each linear array and Y linear arrays aligned one next to another in the transverse direction (where X and Y are integers). The X and Y directions are shown by respective arrows on the figures. This forms an array of X by Y antenna elements. Each linear array includes a transverse phase shifter 200, each of which are connected to an optical power splitter 202. The transverse phase shifter gives a constant phase shift difference for each adjacent linear antenna and thereby provides the solid state steering of the array along the transverse direction. The transverse phase shift ΔΦ is applied to each linear array and by changing this phase shift, the output light can be steered (as a consequence of interference) in the transverse direction (i.e. in a direction perpendicular to that which is achieved by changing the phase shift introduced by the longitudinal phase shifter). The optical power splitter may be any appropriate type, for example a Multimode Interferometer (MMI), a Directional Coupler (DC), a Y Junction, or a star coupler forming part of an Array Waveguide Grating (AWG).

Figure 3:
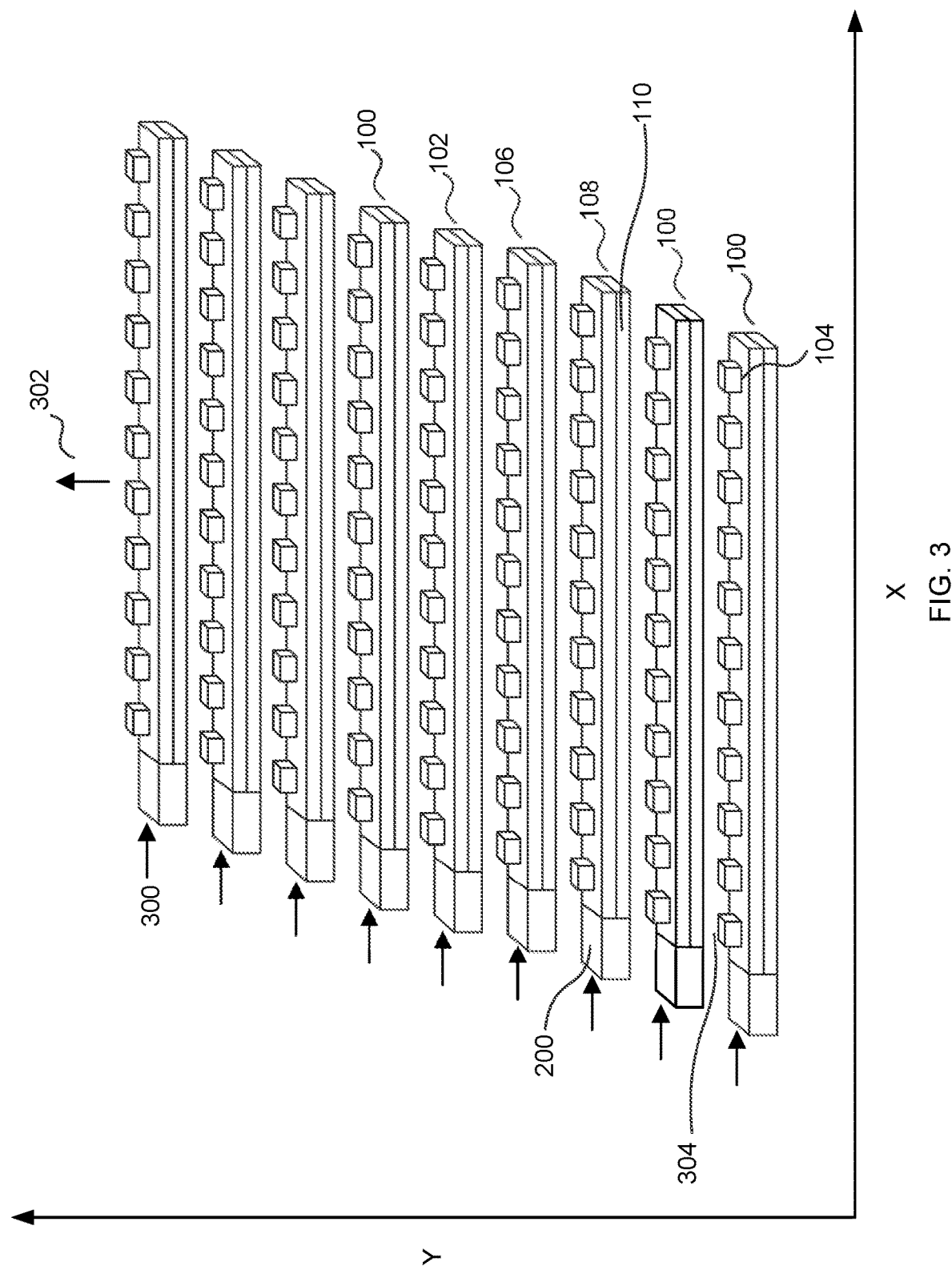
FIG. 3 is a schematic diagram of the FIG. 2 array showing additional aspects.

FIG. 3 shows a view of the overall LiDAR array including the plurality of linear antenna arrays 100 arranged on juxtaposed substantially parallel rows. Each linear antenna array includes the plurality of antenna elements 104 on (or close to) the waveguide 102. The transverse phase shifter 200 and the longitudinal phase shifter 108 are both shown. Light 300 enters the transverse phase shifter (as indicated by the arrows in FIG. 3) and passes along the waveguide and exits from each antenna element to form an overall beam 302. As previously mentioned, the light exiting from each element is subject to the transverse phase shift ΔΦ from the transverse phase shifter and the longitudinal phase shift ΔΦ from the longitudinal phase shifter and may be of different intensity.

By virtue of power splitter 202, each antenna 100 will have a similar power input. A uniform intensity can achieve an optimal construction interference at the spot which will lead to improved resolution. Uniformity can be achieved via antenna element size engineering. Alternatively, the intensity can be smoothed by applying a dropping curve which reduces the emission from the antenna when the light intensity is large.

FIG. 3 also shows trenches or spaces 304 between respective ones of the linear arrays. These trenches are used to isolate the respective linear arrays so that the phase shift in each linear array does not influence that in the next. The separation is also used to prevent light cross talk between two antenna waveguides. However, the space requirement for cross talk prevention is usually smaller than the thermal/voltage isolation. The nature of isolation will depend on the nature of the process by which the longitudinal phase shift is generated, for example thermal or electrical isolation depending on whether heat or voltage are applied to the lower region of the waveguide 108 to give rise to the longitudinal phase shifter 110.

In use, light emitted from a power splitter (not shown) enters the transverse phase shifter of each linear array and undergoes a first transverse phase shift before passing along the length of the waveguide towards the individual antennae. As the light travels along the waveguide it undergoes a longitudinal phase shift before exiting via the antenna element and by spacing the antenna elements equally, there is a constant phase shift between the beams emitted via each of the antenna elements. The light emitted from the power splitter may be a single wavelength light beam. Other incident light may be used although more control may be required. With a single wavelength incident light there is effectively two controls—one that controls the transverse phase shift and one that controls the longitudinal phase shift. There it may be separate controls for each of the transverse phase shifters and a single control that affects all of the longitudinal phase shifters (resulting in Y+1 controls). In addition, there may be one control for each longitudinal phase shifter, resulting in Y+Y controls meaning that the longitudinal phase shifter is controlled antenna by antenna. A control port is not shown but may be located in situ with the array or remote therefrom.

FIG. 4 shows two embodiments illustrating how the longitudinal phase shifter may be implemented.

Figure 4B:
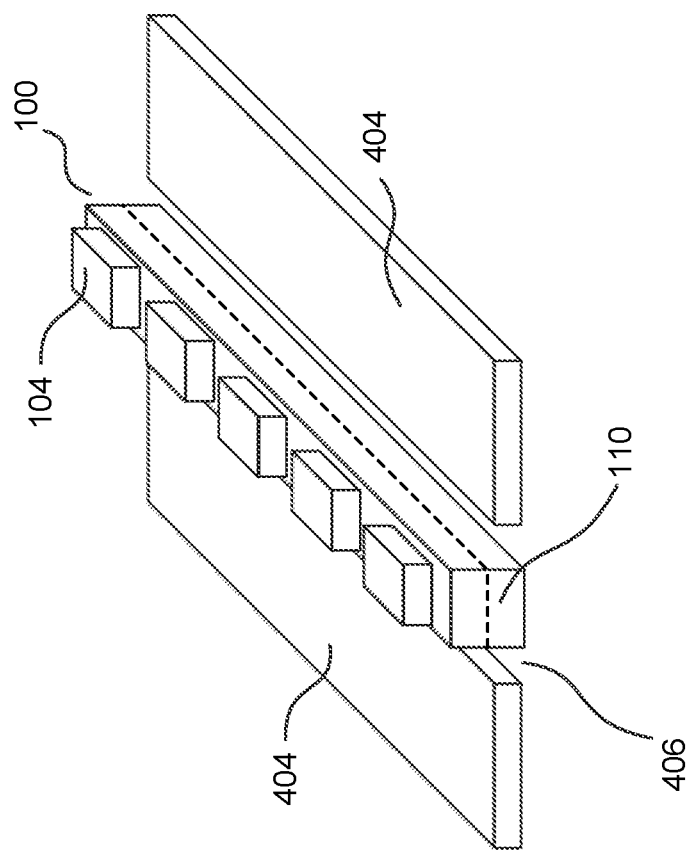
FIGS. 4A and 4B shown two alternative arrangements of elements giving rise to phase shift in the LiDAR antenna array.
Figure 4A:
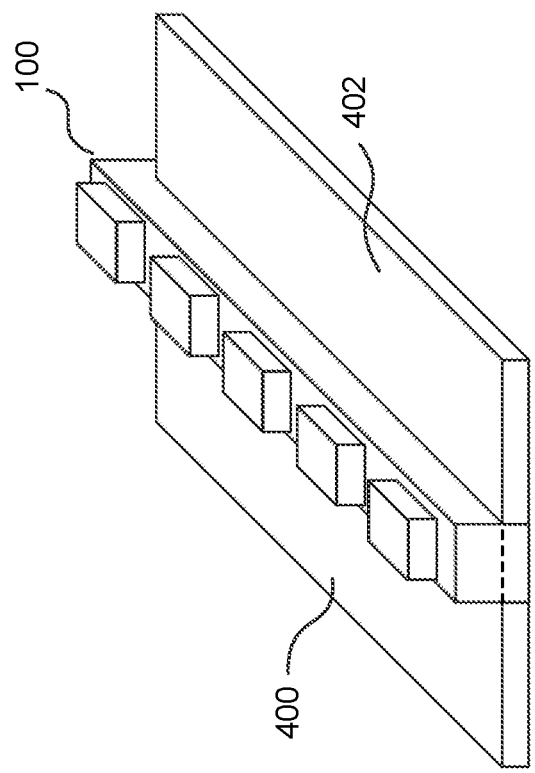

In FIG. 4A the linear array 100 is shown with a number of antenna elements 104 on the upper surface of the waveguide 102. First and second doped portions 400 and 402 respectively are etched at either side of the waveguide. The first and second doped portions may comprise first and second dopant material that are respectively a P-dopant and an N-dopant. The dopant material is applied in strips along the length of the waveguide. The thickness of the strips is a proportion of the thickness of the waveguide. A voltage is applied to the strips which causes a change in the refractive index (RI) in the vicinity of the applied voltage. As a result, a proportion of the waveguide is affected by the voltage and the RI changes caused by this gives rise to a phase change, such that light passing through the waveguide will be additionally phase shifted. The thickness of the dopant strips can be any appropriate proportion of the thickness of the waveguide, for example, of the order of about a half the thickness. The first and second electrical elements act as control elements for applying a voltage to a certain amount of the thickness of the waveguide. As a result, the RI and then the phase are changed when a voltage is applied across these elements.

In an embodiment, the dopant strips are shown as a uniform thickness and width. In alternatives the strips may include cutouts along the length and have a variable thickness and/or doping concentration. The cutouts may align with gaps between the antenna elements. Each of these changes may bring about variations in the phase shift which may be useful in some applications. The strips are shown juxtaposed to the waveguide, but may be separated therefrom by isolation trenches in some situations. Control on a section by section basis (i.e. a grid of antenna) may further smooth the intensity of emission. The use of electrical control of dopants to provide a change in RI in the waveguide offers a relatively fast response which means that control of the phase change is faster in this example than some of the following examples. It should be noted that the speed of response is a consideration in the mode of operation and one alternative may have advantages over others in some applications.

Referring now to FIG. 4B an alternative embodiment is shown. In this case the RI changes and thus the phase changes are caused by the application of heat to a portion of the waveguide. In the embodiment shown, two planar heating elements 404 are used. The planar heating elements are shown on either side of the waveguide and have a thickness that is a proportion of the thickness of the waveguide. The heat from the heating elements causes a change in RI in the waveguide and thereby gives rise to an additional phase shift. The heating element has a slower response time than the dopant in the FIG. 4A example. The heating elements act as the control elements for applying a heat to a certain amount of the thickness of the waveguide. As a result the RI and the phase are changed when heat is applied.

Whilst it is preferred to heat the waveguide from either side and over a certain portion of the thickness other alternatives are possible. For example, the heating element is positioned to optimise the heat in the required areas of the waveguide in a similar orientation to that shown. There may be only one heating element which could be positioned underneath. The requirement to ensure uniformity can be brought about by use of a single block to heat up entire chip to gain uniform RI changes. Using a heating element below the waveguide provides direct heating and reduces cross talk which leads to higher efficiency. As shown the heating element may be separated from the waveguide by a thermal trench 406 to isolate the light from leaking into the heater materials. A further thermal trench (not shown) may be located between respective heater elements prevent overheating of the waveguide itself and/or unwanted thermal effects from one waveguide to the next. As previously discussed thermal or isolation trenches may be located between adjacent longitudinal elements.

FIGS. 4A and 4B show two alternative examples of methods for instilling a change in RI and phase change in the waveguide. It is possible that a combined methodology using voltage and heat may be used in some applications, however, limited space between the two waveguides may make this less desirable. If the waveguides are separated too much side lobes will cause the main lobe loss energy and reduce to possible steering angle leading to an aliasing effect.

It should be noted that the linear array is shown with the antenna elements on top of the waveguide. It is possible that the arrangement of the waveguide and antenna elements could be different from the example shown. For example the antenna elements could be located within the waveguide and the longitudinal phase shifter could be located either above or below the antenna elements. If above, windows (not shown) may be included which align with the antenna to allow the light to exit from the array. In this type of orientation the material of the waveguide and the heating elements or dopants may need to be optically transmissive to enable light to exit from the device from the antenna elements.

Referring to FIG. 5A to 5E a method for manufacturing a linear antenna array is described in simplified steps. In FIG. 5A a silicon on insulator (SOI) wafer 500 is chosen having the necessary dimension for the intended final device. As shown in FIG. 5B the SOI wafer incudes a wafer or substrate 502, a dielectric layer 504 and an upper layer 506. The upper layer is made from material such as for example Silicon (Si) or Silicon Nitride (SiN) Silicon oxynitride (SiON), ALN, Amorphous silicon (a-Si) or polycrystalline Silicon (Poly-Si). The phase shifting method will change according to the materials used. The dielectric layer 504 is made from for example silicon dioxide or the like. The upper layer 506 comprising for example a coupler 508; a splitter 510; a first part of the waveguide 512 and a second part of the waveguide 514. In general, any material with different refractive index compared to cladding material of the waveguide can be used as antenna or any other element. The materials listed are not limiting and any materials can be used as long as they are appropriate for the fabrication technique and provide the functionality described herein. It should be noted some materials have a lower coefficient, such as AlN has lower thermo-optical coefficient and hence some phase shifting method may have lower efficiency. Referring to FIGS. 5B and 5C, the longitudinal phase shifter is implemented by one or more of heating elements 516 or P-dopant and N-dopant 518 and 520 respectively. The material for the heating element may include for example, NiSi as a side heater; TiN as a bottom heater and in a Si waveguide, P/N doped Si can also serve as a heater. Typical P-dopant and N-dopant materials are for example respectively Boron and Phosphorous. A further layer of dielectric 522 may then be applied as shown in FIG. 5C. An antenna element 523 is applied above the waveguide 520 either in direct contact or having a thin oxide layer there between. The transverse phase shifter 524 is added above the dielectric as shown in FIG. 5D. Electric connections 526; 528 and 530 for the phase shifters are added as shown in FIG. 5E. The whole device may be encapsulated in dielectric material that is transparent to the working wavelength. A laser diode 532 may be attached in any appropriate manner.

The above described steps are very much simplified and it will be appreciated that they are only by way of example. Other and additional processes may occur in order to complete the required device. For example integration into a larger device; the addition of other elements and control circuitry; adaptation of the current steps for different applications, material and sizes of array; etc.

As previously mentioned the resultant LiDAR antenna as shown for example in FIG. 3 includes a plurality of linear antenna arrays positioned one next to another. The individual linear arrays can be manufactured as individual elements and then combined in a separate process. As an alternative, the whole combination of linear arrays can be made via a single set of process steps. This will help control the cost of manufacture and avoid the later additional costs and effort associated with packaging and calibration of the array. Not all the steps are described in detail and it will be appreciated that additional steps may be implemented for different orientations, shapes and sizes of device.

The steering of the antennae is carried out by applying a transverse phase shift and a longitudinal phase shift to the antenna elements. As previously discussed the transverse phase shift is produced for each linear antenna via the transverse phase shifter and longitudinal phase shift via the longitudinal phase shifter. Each antenna may be individually controlled via a control signal in each or both of two (X and Y) directions. A single control in each direction may be provided for each antenna element in a given direction by a phase shifter having a specific design. For example referring to FIG. 3 the phase shifters 200 are controlled to give all the antenna waveguide 100 the same phase difference. E.g. 100A and 100B have a phase difference of Z then 100E and 100F have the phase difference of Z. Similarly the longitudinal phase shifter generates the same phase shift for each antenna in the array 100A.

The two phase shifters in the present invention are ideally orthogonal to one another, but this is not intended to be limiting. With a more complex control circuit it may be possible to apply phase shift in two different directions which are not orthogonal to one another.

It may be possible to control the phase of a sub-array of antenna as a single element. For example a 4×4 block of antenna may be controlled by a single transverse phase shift and a single longitudinal phase shift.

Figure 6B:
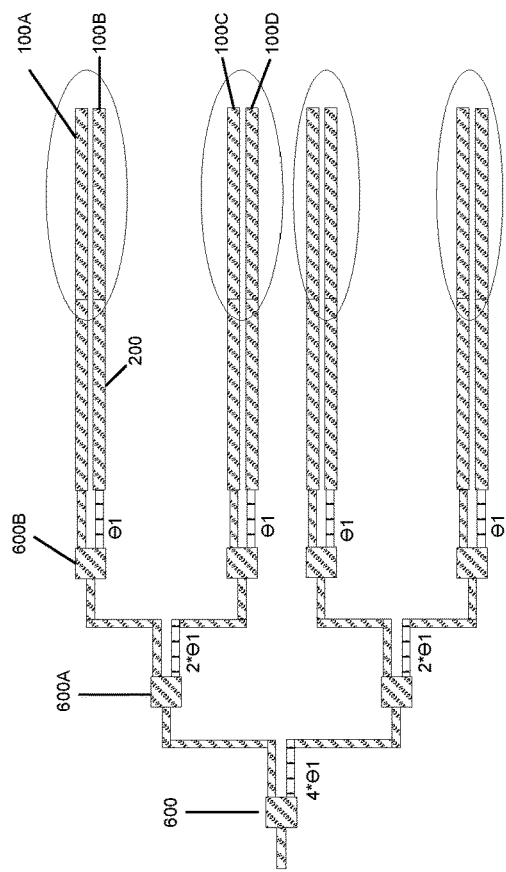
FIGS. 6A and 6B show arrangements demonstrating the control of the antenna according to an embodiment of the present invention.
Figure 6A:
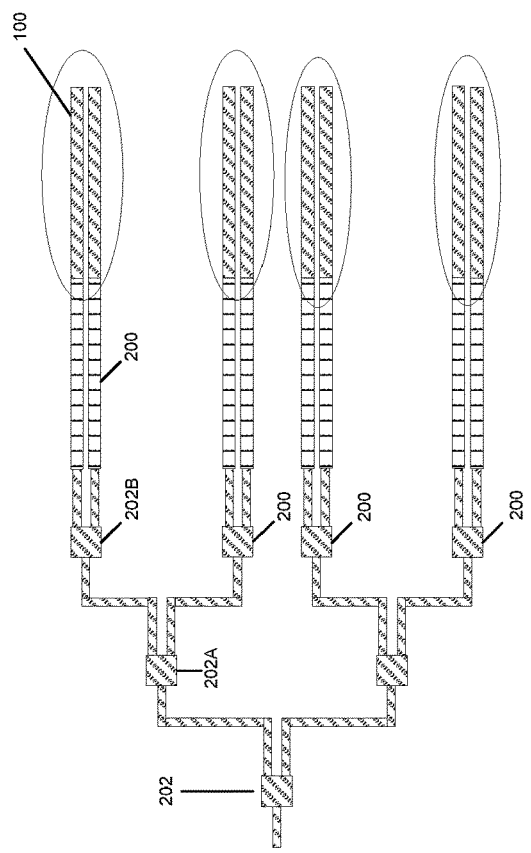

FIGS. 6A and 6B are simple drawing for illustrating the transverse phase shifter blocking circuits to providing control in the transverse direction. The FIG. 6A shows a three stage MMI as the power splitter circuits 202, 202A, 202B. The power may be split more or less than three times depending on the circuit requirements. The transverse phase shifters 200 then apply a transverse phase shift to each antenna array 100. Each antenna is controlled individually. The final result is to make sure the antenna has the same phase difference.

In FIG. 6B a multilayer phase shift and power split may be applied to each antenna or antenna array. There are a plurality of cascaded layers 600, 600A and 600B. For each of the cascaded layer of power splitter, the transverse phase shifter blocking circuits 200 are identical, controlled by single input and produce the same phase difference. Therefore, for each block, the first antenna 100 A has 0 phase shift, second 100B has θ1, third 100C has 2*θ1 and fourth 100D has 3*θ1. The block size could be extended to entire circuits and the control signal could be reduced to $\log_2(Y)$ or by an appropriate design of the heater length, a single control signal could be achieved.

Other sizes of blocks could be similarly controlled. As a result, a single control signal is required for a column, row, by sub-array or even over the whole array. By controlling a number of antennae using a single control signal means the overall control of the device steering is much reduced, particularly when compared with an antenna by antenna arrangement as is found in current systems.

The present invention may include a number of variations and alternatives to the examples described above. These are intended to be encompassed within the scope of the invention. The invention is specifically for LiDAR arrays but may also be used on other arrays for example 2D and 3D projection imaging with an adapted extra lens.

According to an embodiment there is provided an antenna or antenna array for a steerable light beam, the antenna array comprising a plurality of linear antenna arrays (100), each linear antenna array comprising: a plurality of antenna elements (104); a waveguide (102) supporting the antenna elements having a length and a thickness; and a control element (400, 402, 404), adjacent to the waveguide, arranged to induce a change in refractive index along at least a part of the length of the waveguide and in at least a part of the thickness of the waveguide, wherein the change in refractive index in the waveguide causes a phase shift in light emitted via each of the plurality of antenna elements.

Preferably, the change in refractive index is induced in a linear region (108) of the waveguide.

Preferably, the linear region is located along the length of the waveguide.

Preferably, the defined linear region is in a lower portion of the waveguide.

Preferably, the change in refractive index is caused by application of a voltage or heat to the portion of the waveguide from the control element.

Preferably, heat is applied by a heater element located juxtaposed to the portion of the waveguide.

Preferably, there are two heating elements (404), one on either side of the portion of the waveguide.

Preferably, a voltage is applied via a pair of doped regions (400, 402) located on either side of the portion of the waveguide.

Preferably, the control elements define a first longitudinal phase shifter (110) in the waveguide.

Preferably, a transverse phase shifter (200) is located at an end of the waveguide.

Preferably, light emitted by the antenna array is steerable by at least one of the first and second phase shifts in one or more directions.

Preferably, light emitted by the antenna array is steerable by tuning the phase shift between adjacent antenna elements in the array.

Preferably, a single control signal is applied in respective orthogonal directions by inducing the change in the refractive index in corresponding respective orthogonal directions.

Preferably, the waveguide is made from a low loss material such as for example Silicon (Si) or Silicon Nitride (SiN).

Preferably, the antenna elements are made from one of Silicon Nitride (SiN), Silicon Dioxide (SiO2), and Aluminum Nitride (AlN).

Preferably, there is a combination with an optical power splitter to allow entry of light to the array.

According to a further embodiment there is provided a method of fabricating an antenna or antenna array, the method comprising: forming a first waveguide from a first material (512); forming a plurality of antenna elements (512) from a second material; forming at least one or more additional elements (516; 518; 520) in the vicinity of a portion of the waveguide arranged to induce a change in refractive index along at least a part of the length of the waveguide and in at least a part of the thickness of the waveguide, forming at least one layer of dielectric material (504).

Preferably, forming the additional elements as one of a heating element and a voltage generating element can cause a change in the refractive index of the defined portion of the waveguide.

Preferably, further comprising forming at least one of a beam coupler, a beam splitter, and a transverse phase shifter.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. An antenna array controllable light beams, the antenna array comprising a plurality of linear antenna arrays (100), each linear antenna array comprising:
   a plurality of antenna elements (104);
   a waveguide (102) supporting the antenna elements having a length and a thickness;
   a transverse phase shifter (200) located at an end of the waveguide; and
   a control element (400, 402, 404), adjacent to the waveguide, arranged to induce a change in refractive index along at least a part of the length of the waveguide and in at least a part of the thickness of the waveguide, wherein the control elements define a longitudinal phase shifter extending along the length of the waveguide, wherein the control elements comprise a pair of doped regions (400, 402) located on either side of the waveguide and separated by the waveguide, wherein the change in refractive index in the waveguide causes a phase shift in light emitted via each of the plurality of antenna elements.

2. The antenna array according to claim 1, wherein the change in refractive index is induced in a linear region (108) of the waveguide.

3. The antenna array according to claim 2, wherein the linear region is located along the length of the waveguide.

4. The antenna array according to claim 2, wherein the linear region is in a lower portion of the waveguide.

5. The antenna array according to claim 1, wherein the change in refractive index is caused by application of a voltage or heat to a portion of the waveguide from the control element.

6. The antenna array according to claim 5, wherein heat is applied by a heater element located juxtaposed to the portion of the waveguide.

7. The antenna array according to claim 6, wherein there are two heating elements positioned on either side of the portion of the waveguide.

8. The antenna array according to claim 1, wherein light emitted by the antenna array is steerable by at least one of a first and second phase shifts in one or more directions.

9. The antenna array according to claim 1, wherein light emitted by the antenna array is steerable by tuning a phase shift between adjacent antenna elements in each linear antenna array.

10. The antenna array according to claim 1, wherein the waveguide is made from a low loss material such as for example Silicon (Si) or Silicon Nitride (SiN).

11. The antenna array according to claim 1, wherein the antenna elements are made from one of Silicon Nitride (SiN), Silicon Dioxide (SiO2), and Aluminum Nitride (AlN).

12. The antenna array according to claim 1, in combination with an optical power splitter to allow entry of light to the array.

13. A method of fabricating the antenna array according to claim 1, the method comprising:
   forming a first waveguide from a first material (512);
   forming a plurality of antenna elements (512) from a second material;
   forming a transverse phase shifter (524) at an end of the first waveguide;
   forming at least one or more additional control elements (516; 518, 520) arranged to induce a change in refractive index along at least a part of the length of the first waveguide and in at least a part of the thickness of the first waveguide, wherein the control elements define a longitudinal phase shifter extending along the length of the first waveguide, wherein the control elements comprise a pair of doped regions located on either side of the first waveguide and separated by the first waveguide, forming at least one layer of dielectric material (504).

14. The method according to claim 13, further comprises:
   forming the additional control elements as one of a heating element and a voltage generating element which can cause the change in the refractive index of the at least part of the length of the first waveguide.

15. The method according to claim 13, further comprising forming at least one of a beam coupler, and a beam splitter.

* * * * *

UNITED STATES PATENT AND TRADEMARK OFFICE
CERTIFICATE OF CORRECTION

| | |
|---|---|
| PATENT NO. | : 12,313,786 B2 |
| APPLICATION NO. | : 17/414999 |
| DATED | : May 27, 2025 |
| INVENTOR(S) | : Guo Qiang Patrick Lo, Bo Li and Lian Xi Larry Lia |

It is certified that error appears in the above-identified patent and that said Letters Patent is hereby corrected as shown below:

In the Claims

In Column 11, Line 27, in Claim 1, after "An antenna array" and before "controllable light beams," the term --for-- should be inserted.

In Column 12, Line 36, in Claim 13, delete "(516; 518, 520)" and insert --(516, 518, 520)--.

Signed and Sealed this
Twenty-sixth Day of August, 2025

Coke Morgan Stewart
*Acting Director of the United States Patent and Trademark Office*